(12) United States Patent
Chinnadurai et al.

(10) Patent No.: US 9,348,574 B2
(45) Date of Patent: May 24, 2016

(54) METHOD FOR HAVING MULTIPLE SOFTWARE PROGRAMS ON A DIAGNOSTIC TOOL

(75) Inventors: Manokar Chinnadurai, Owatonna, MN (US); Tony Fischer, Blooming Prairie, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 2227 days.

(21) Appl. No.: 11/392,627

(22) Filed: Mar. 30, 2006

(65) Prior Publication Data
US 2007/0240146 A1    Oct. 11, 2007

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
None
See application file for complete search history.

(56) References Cited

U.S. PATENT DOCUMENTS

| | | | | |
|---|---|---|---|---|
| 5,359,730 A | * | 10/1994 | Marron | 717/169 |
| 5,361,360 A | * | 11/1994 | Ishigami et al. | 717/103 |
| 6,463,584 B1 | * | 10/2002 | Gard et al. | 717/171 |
| 6,490,722 B1 | * | 12/2002 | Barton et al. | 717/174 |
| 6,557,169 B1 | * | 4/2003 | Erpeldinger | 717/173 |
| 6,928,579 B2 | * | 8/2005 | Aija et al. | 717/174 |
| 2005/0055595 A1 | * | 3/2005 | Frazer et al. | 713/400 |
| 2007/0261027 A1 | * | 11/2007 | Dhanakshirur et al. | 717/113 |
| 2009/0144720 A1 | * | 6/2009 | Roush et al. | 717/171 |

OTHER PUBLICATIONS

Cook, et al. "MonDe: Safe Updating through Monitored Deployment of New Component Versions", 2005, ACM, p. 43-46.*

* cited by examiner

*Primary Examiner* — Qamrun Nahar
(74) *Attorney, Agent, or Firm* — Baker & Hostetler LLP

(57) ABSTRACT

A method is provided that allows a computing device such as a scan tool, to operate two versions of a software. The scan tool can detect when a updated version is stored on a computer readable device and can automatically load the updated version to use, while allowing the previous version to remain on the scan tool for use at another time.

20 Claims, 3 Drawing Sheets

METHOD FOR HAVING MULTIPLE SOFTWARE PROGRAMS ON A DIAGNOSTIC TOOL

FIELD OF THE INVENTION

The present invention relates generally to an automotive scan tool. More particularly, the present invention relates to an automotive scan tool having multiple software on a diagnostic tool.

BACKGROUND OF THE INVENTION

Virtually all-modern automotive scan tools use expandable memory storage based on flash memory devices such as compact flash, secure digital, memory stick, etc. (collectively "memory card"). Other expandable memory storage includes hard drive, compact disc (CD), digital video disc (DVD), universal media disc (UMD), other computer readable medium and their drives/readers that can be external and connected to the scan tool via Universal Serial Bus (USB), FIREWIRE or other communication protocols or these devices may be integrated into the scan tool. These expandable memory storage devices can store data or new software that can be loaded into the scan tool. The software can be an operating system, or provide the scan tool with its functionality, such as software to communicate with a certain communication protocol of a vehicle.

In order to update a software in a scan tool, the user would typically insert the memory card into a memory card reader located on the periphery of the scan tool. Then, through a series of manipulation of keys on the scan tool, the old program is overwritten by the new software. In order to get the old program back on the scan tool, the user would have to reload it. Typically, having new software with the latest features is desirable, however, should there be features that the user would like to retain that is not available in the new update, the user would not be able to use these features.

Accordingly, it is desirable to provide a method that will allow the updated software to be used, but still retain the old software on the scan tool.

SUMMARY OF THE INVENTION

The foregoing needs are met, to a great extent, by the present invention, wherein in one aspect an apparatus is provided that in some embodiments a scan tool includes a battery cover that can cover at least a portion of a battery compartment and a card reader.

In accordance with one embodiment of the present invention, a method of using a software in a scan tool is provided and includes providing the scan tool having a previous software, inserting a computer readable medium having an updated software into a reader, loading the updated software for use by a user without affecting the previous software, and using the updated software. The updated software can be automatically loaded and can be a different version of the previous software. The method can further include loading up previous software, and using the previous software simultaneously with the updated software. The reader can read at least one of the following compact flash card, floppy disc, memory stick, secure digital, flash memory, CD, DVD and UMD. Additionally, loading the updated software can be done by a user selecting the updated software from a graphical user interface or by a user using an input device.

In accordance with another embodiment of the present invention, a method of having two software version on a scan tool is provided and includes providing the scan tool having a previous software, detecting a computer readable medium having an updated software in a reader, selecting with an input device from a graphical user interface to load the updated software, loading the updated software for use by a user without affecting the previous software, and using the updated software. The updated software can be a different version of the previous software. The method can further comprise loading up the previous software, and using the previous software simultaneously with the updated software. The reader can read at least one of the following compact flash card, floppy disc, memory stick, secure digital, flash memory, CD, DVD and UMD. Additionally, the method can include toggling between using the previous software and the updated software with the input device. Without affecting the previous software can include not overwriting the previous software when the updated software is loaded or not leaving any residual part of the updated software when the updated software is unloaded. The graphical user interface can be manually activated by the user.

In accordance with yet another embodiment of the present invention, a method of having two software version on a scan tool can include providing the scan tool having a previous software, detecting for a computer readable medium having an updated software in a reader, manually activating a graphical user interface with an input device, wherein the graphical user interface allows the user to select to load the updated software, selecting with the input device to load the updated software from the graphical user interface, loading the updated software for use by a user without affecting the previous software, and using the updated software. The method can further include loading up previous software, and using the previous software simultaneously with the updated software. Without affecting the previous software can include not overwriting the previous software when the updated software is loaded. Additionally, the method can include toggling between using the previous software and the updated software with the input device. The reader can read at least one of the following compact flash card, floppy disc, memory stick, secure digital, flash memory, CD, DVD and UMD.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
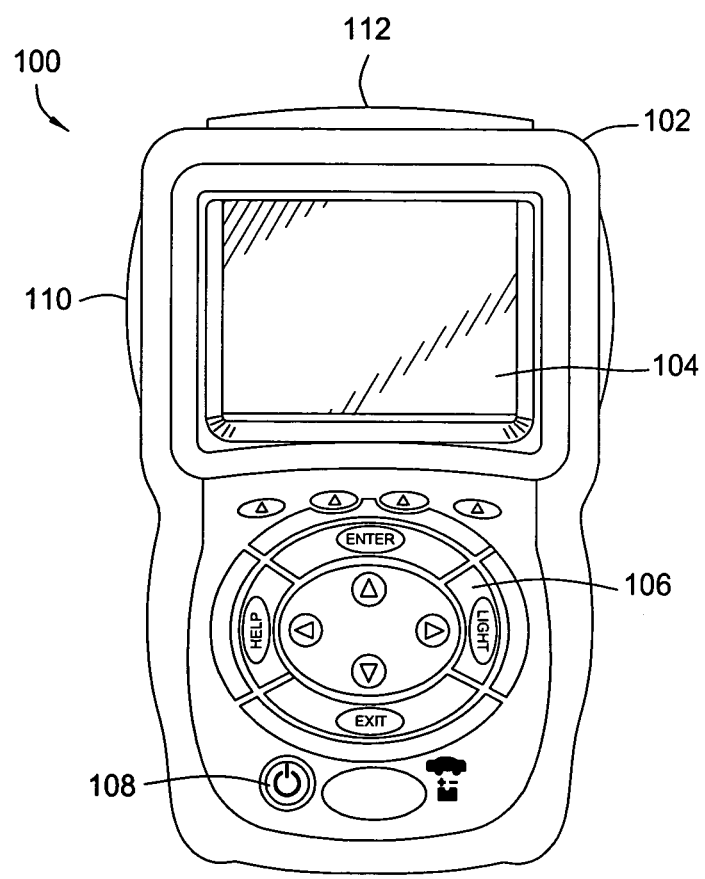
FIG. 1 is a front view illustrating a scan tool according to an embodiment of the invention.

The invention will now be described with reference to the drawing figures, in which like reference numerals refer to like parts throughout. An embodiment in accordance with the present invention provides for a method for allowing a user of a scan tool to retain and use both the previous and updated versions of a software or multiple software. The "previous software" as used herein is the software version that is currently resides on the scan tool.

The "updated software" as used herein can be the same software as the previous software but updated. For example, the updated software can be version 1.1 or 2.0 of the previous software (version 1.0). The "updated software" can also be software that is related to the previous software, but not necessarily the same software. The "updated software" can be loaded onto and unloaded from the scan tool without affecting the previous software or the operating system (if the updated software is not the operating system).

"Scan tool" as used herein can be any computing device that includes a processor or controller. For example, a desktop computer, a notebook, personal digital assistant (PDA), a phone, or any other computing device.

FIG. 1 is a front view illustrating a scan tool 100 according to an embodiment of the invention. The scan tool can be any computing device, such as, for example, the Nemisys scan tool from Service Solutions (a unit of the SPX Corporation) in Owatonna, Minn. The scan tool 100 includes a housing 102 to house the various components of the scan tool, such as a screen 104, a user interface 106, a power key 108, a memory card reader 110 and a connector interface 112. The screen 104 can be any screen, for example, LCD (liquid crystal display), VGA (video graphics array), touch screen (can also be a user interface), etc. The user interface 106 allows the user to interact with the scan tool in order to operate the scan tool as desired. The user interface 106 can include function keys, arrow keys or any other type of keys that can manipulate the scan tool 100 in order to operate the previous and/or updated software. The user interface can also include numbers or be alphanumeric. The power key 108 allows the user to turn the scan tool on and off, as required.

Memory card reader 110 can be a single type card reader, such as a compact flash card, floppy disc, memory stick, secure digital, flash memory or other types of memory. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the scan tool 100 to connect to an external device, such as an ECU (electronic control unit) of a vehicle, a computing device, an external communication device (such as a modem), a network, etc. through a wired or wireless connection. Interface 112 can also include a USB, FIREWIRE, modem, RS232, RS485, and other connections to communicate with external devices, such as a hard drive, USB drive, CD player, DVD player, UMD player or other computer readable medium devices.

Figure 2:
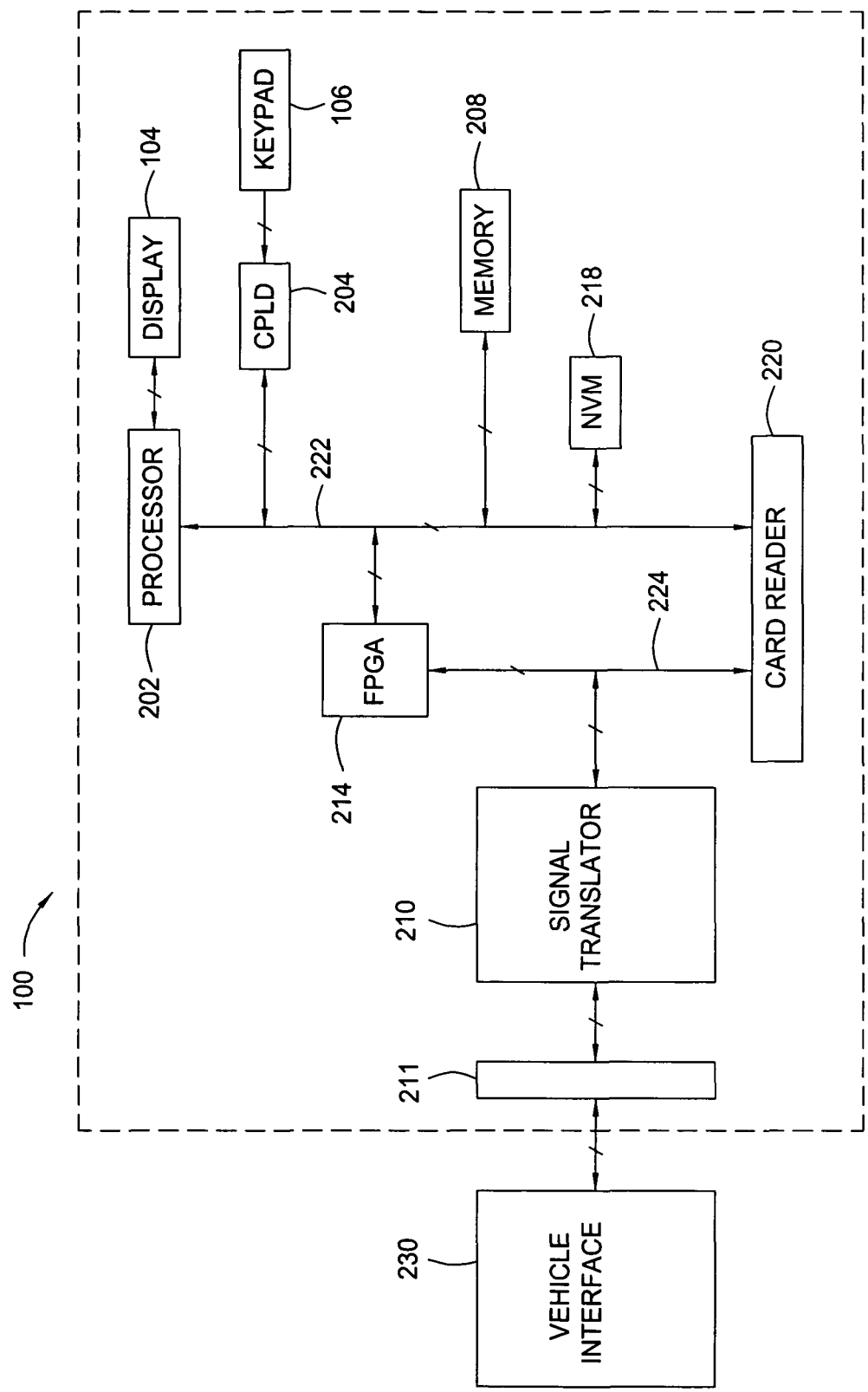
FIG. 2 is a block diagram of the components of a diagnostic tool.

FIG. 2 is a block diagram of the components of a diagnostic tool 100. In FIG. 2, the diagnostic tool 100 according to an embodiment of the invention includes a processor 202, a field programmable gate array (FPGA) 214, a system bus 224, the display 104, a complex programmable logic device (CPLD) 204, the user interface 106 in the form of a keypad 106, a memory subsystem 208, an internal non-volatile memory 218, a card reader 220, a system bus 222, the connector interface 112, and a selectable signal translator 210. A vehicle communication interface 222 is in communication with the diagnostic tool 100 through connector interface 112 via an external cable (not shown).

Selectable signal translator 210 communicates with the vehicle communication interface 230 through the connector interface 112. Signal translator 210 conditions signals received from a motor vehicle control unit through the vehicle communication interface 230 to a conditioned signal compatible with diagnostic tool 100. Translator 210 can communicate with, for example, the following communication protocol: J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by FPGA 214 (e.g., by tri-stating unused transceivers) or by providing a keying device that plugs into the connector interface 112 that is provided by diagnostic tool 100 to connect diagnostic tool 100 to vehicle communication interface 230. Translator 210 is also coupled to FPGA 214 and the card reader 220 via bus 224. FPGA 214 transmits to and receives signals (i.e., messages) from the motor vehicle control unit through translator 210.

FPGA 214 is coupled to processor 202 through various address, data and control lines by the system bus 222. FPGA 214 is also coupled to the card reader 220 through bus 224. Processor 202 is also coupled to the display 104 in order to output the desired information to the user. The processor 202 communicates with the CPLD 204 through system bus 222. Additionally, processor 202 is programmed to receive input from the user through the keypad 106 via the CPLD 204. The input device 106 can also be a mouse or any other suitable input device. The CPLD 204 provides logic for decoding various inputs from the user of diagnostic tool 100 and also provides glue-logic for various other interfacing tasks.

Memory subsystem 208 and internal non-volatile memory 218 are coupled to system bus 222, which allows for communication with the processor 202 and FPGA 214. Memory subsystem 208 can include an application dependent amount of dynamic random access memory (DRAM), a hard drive, and/or read only memory (ROM). Software to run the scan tool 100 can be stored in the memory subsystem 208, including the previous software. Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 114, memory 218 can contain downloadable images so that FPGA can be reconfigured for a different group of communication protocols.

The card reader 220 can contain the updated software that can be used by the scan tool on a memory device. The updated software can include improved or additional features that the user would like to have access to. However, this could mean that the updated software no longer includes features that the user likes or drivers that allow the scan tool to talk to legacy equipment. For example, the updated software may include new features to show the data being collected only on dual screen (data and graph), but the user in certain applications prefer using the whole screen because it is easier to read the numbers and is less distracting. Additionally, the updated software may not have drivers that are needed to drive certain external devices, such as a legacy printer and thus, the user is forced to upgrade to a new printer from a perfectly good printer in order to use the updated software. The updated software can also be stored on other computer readable medium such as, floppy disc, USB drive, hard drive, CD, DVD, UMD, and similar medium. The updated software can be loaded onto any memory that is available in the scan tool, however, it should not be loaded onto a memory that will erase the previous software.

In one embodiment, the processor 202 can be programmed to look for updated software on external or internal memory devices, such as the card reader, CD drives, floppy drives, UMD drives, DVD drives, hard drives, USB flash drives or similar devices before loading the previous software. The processor can look for the updated software when it first boots up or whenever the software is provided to the scan tool on a computer readable medium. For example, if there is a computer readable media in an internal card reader or in the external memory device, the processor can be programmed to look for updated software first and automatically load that for use instead of loading the previous version. If there is no updated software, then the processor can proceed with loading the previous software for use as normal.

In an alternative embodiment, the processor can provide a graphical user interface or a menu on the display so that the user can have an option as to which version to load. By providing a menu, the user can choose between loading the previous software, the updated software, or both. The menu can be provided to the user automatically when the processor detects an updated version in the card reader or external memory device. Alternatively, the user can also bring the menu up manually so that he can easily switch between the two software. Still another alternative, the scan tool can have a hotkey that allows the user to toggle between the two software or to activate and/or deactivate the respective software.

Figure 3:
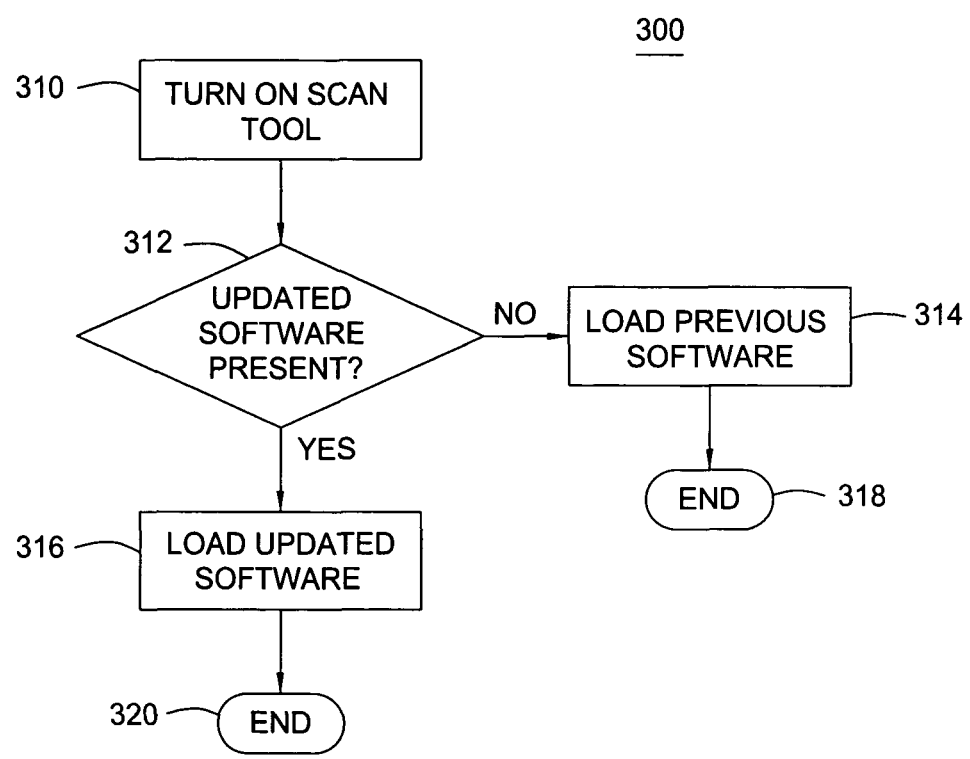
FIG. 3 illustrates a method according to an embodiment of the invention.

FIG. 3 illustrates a method 300 according to an embodiment of the invention. In operation, at step 310, the user turns on the scan tool in order for the scan tool to function. Method 300 can also start at 312, if the scan tool is already powered on. At step 312, the processor can determine whether the updated software is present. The processor determines if there is a computer readable medium present in the card reader or external memory devices. If present, then the processor can determine if the updated software is present or if the computer readable medium contains other information such as data from a previous scan. If yes or the updated software is present, then at step 316, the processor can automatically load the updated software for the user to use. Depending on the updated software, or the previous software, the previous software could also be prevented from being loaded in order to prevent any conflicts. If both the previous and the updated software can function at the time (without conflicts), the processor can be programmed to have both running at the same time, if desired by the user. Once the user has finished using the updated software, then the method can end at step 320. If the updates software is not present, then the processor can load the previous software for the user to use. Once the user has finished using the previous software, then the method can end at step 318.

Alternatively, at step 312, the processor can determine if there is a software update present. Then at step 316, the processor can present a menu for the user to select to load up the updated software and/or previous software, or the user can bring up the menu manually. Again, depending on the software, the previous software could also be prevented from being loaded in order to prevent any conflicts. If both the previous and the updated software can function at the time (without conflicts), the processor can be programmed to have both running at the same time, if desired the user.

A person skilled in the art will recognize that the updated software can also be sent to the scan tool via wire or wireless communication. In this embodiment, the updated software can be loaded into the scan tool on the internal memory such as random access memory (RAM). Thus, still preserving the previous software on the scan tool on a different memory.

By allowing the scan tool to load and unload the updated software without overwriting or affecting the previous software, the user can try the updated software and features without fear of losing or affecting the previous software. Once the updated software is unloaded from the scan tool it should not leave any residual parts that can affect the operating system. This allows the user to retain the features he likes in the previous software while using the features he likes in the updated software. Additionally, by retaining the previous software, the user can still run legacy equipment with the drivers supplied in the previous software and will not be forced to make an unnecessary upgrade.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of using a software in a scan tool, comprising:
   providing the scan tool having a previous software;
   receiving a computer readable medium having an updated software of the previous software using a reader;
   loading, via a processor, the updated software for use by a user without affecting the previous software; and
   using the updated software, wherein the previous software may be is configured to be used while the updated software is being used if they do not conflict with each other.

2. The method of claim 1, wherein the updated software is automatically loaded.

3. The method of claim 1, wherein the updated software is a different version of the previous software.

4. The method of claim 1 further comprising:
   loading up the previous software; and
   using the previous software simultaneously with the updated software.

5. The method of claim 1, wherein the reader reads at least one of the following compact flash card, floppy disc, memory stick, secure digital, flash memory, CD, DVD and UMD.

6. The method of claim 1, wherein the loading the updated software is done by the user selecting the updated software from a graphical user interface.

7. The method of claim 1, wherein the loading the updated software is done by the user using an input device.

8. A method of having two software versions on a scan tool, comprising:
   providing the scan tool having a previous software;

detecting, via a processor, a computer readable medium in a reader and having an updated software of the previous software;

receiving an input from an input device via a graphical user interface to load the updated software;

loading, via the processor, the updated software for use by a user without affecting the previous software; and using the updated software, wherein the previous software is configured to be used while the updated software is being used if they do not conflict with each other.

9. The method of claim 8, wherein the updated software is a different version of the previous software.

10. The method of claim 8, further comprising:
loading up the previous software; and
using the previous software simultaneously with the updated software.

11. The method of claim 8, wherein the reader reads at least one of the following compact flash card, floppy disc, memory stick, secure digital, flash memory, CD, DVD and UMD.

12. The method of claim 10 further comprising toggling between using the previous software and the updated software with the input device.

13. The method of claim 8, wherein without affecting the previous software includes not overwriting the previous software when the updated software is loaded.

14. The method of claim 8, wherein without affecting the previous software includes not leaving any residual part of the updated software when the updated software is loaded.

15. The method of claim 8, wherein the graphical user interface is manually activated by the user.

16. A method of having two software versions on a scan tool, comprising:
providing the scan tool having a previous software;
detecting, via a processor, for a computer readable medium in a reader and having an updated software of the previous software;
activating a graphical user interface via an input device, wherein the graphical user interface allows a user to select to load the updated software;
receiving an input via the input device to load the updated software from the graphical user interface;
loading, via the processor, the updated software for use by the user without affecting the previous software; and
using the updated software, wherein the previous software is configured to be used while the updated software is being used if they do not conflict with each other.

17. The method of claim 16 further comprising:
loading up the previous software; and
using the previous software simultaneously with the updated software.

18. The method of claim 16, wherein without affecting the previous software includes not overwriting the previous software when the updated software is loaded.

19. The method of claim 17 further comprising toggling between using the previous software and the updated software with the input device.

20. The method of claim 16, wherein the reader reads at least one of the following compact flash card, floppy disc, memory stick, secure digital, flash memory, CD, DVD and UMD.

* * * * *